United States Patent [19]

Fujiki et al.

[11] Patent Number: 5,952,397
[45] Date of Patent: Sep. 14, 1999

US005952397A

[54] PHOTO-CURABLE LIQUID SILICONE RUBBER COMPOSITIONS FOR TEMPLATING MOTHER MOLDS

[75] Inventors: Hironao Fujiki; Takafumi Sakamoto, both of Usui-gun, Japan

[73] Assignee: Shin-Etsu Chemical Co., Ltd., Japan

[21] Appl. No.: 08/937,001

[22] Filed: Sep. 24, 1997

[30] Foreign Application Priority Data

Sep. 25, 1996 [JP] Japan ................................. 8-274067

[51] Int. Cl.$^6$ ............................ B29C 35/08; C08L 83/05; C08L 83/07; C08L 83/06
[52] U.S. Cl. ............................ 522/99; 522/148; 528/33; 528/31; 528/32; 528/40; 264/496
[58] Field of Search .................... 522/99, 148; 528/31, 528/32, 33, 40; 264/496

[56] References Cited

U.S. PATENT DOCUMENTS

| | | |
|---|---|---|
| 4,530,879 | 7/1985 | Drahnak . |
| 4,591,608 | 5/1986 | Okinoshima . |
| 4,640,939 | 2/1987 | Cavezzan et al. . |
| 4,640,940 | 2/1987 | Jacobine et al. . |
| 4,935,455 | 6/1990 | Huy et al. . |

FOREIGN PATENT DOCUMENTS

| | | |
|---|---|---|
| 0 152 179 | 8/1985 | European Pat. Off. . |
| 0 336 633 | 10/1989 | European Pat. Off. . |
| 3-114711 | 5/1991 | Japan . |
| 7-205157 | 8/1995 | Japan . |

OTHER PUBLICATIONS

Patent Abstracts of Japan, vol. 096, No. 011 (JP 08 183055 A), Jul. 1996.
Patent Abstracts of Japan, vol. 095, No. 011 (JP 07 216232 A), Aug. 1995.
Patent Abstracts of Japan, vol. 015, No. 310 (JP 03 114711 A), May 1991.
Patent Abstracts of Japan, vol. 016, No. 376 (JP 04 122615 A), Apr. 1992.

*Primary Examiner*—Susan W. Berman
*Attorney, Agent, or Firm*—Millen, White, Zelano, & Branigan, P.C.

[57] ABSTRACT

A photo-curable liquid silicone rubber composition is curable upon exposure to light into a cured product having a Shore A hardness of 20 to 60 and a light transmittance of at least 10% at a wall gage of 10 mm. The composition is suitable for forming a transparent templating mother mold which allows a photo-curable liquid resin cast therein to be cured with light transmitted by the mold wall.

8 Claims, No Drawings

PHOTO-CURABLE LIQUID SILICONE RUBBER COMPOSITIONS FOR TEMPLATING MOTHER MOLDS

BACKGROUND OF THE INVENTION

1. Field of the Invention

This invention relates to a photo-curable liquid silicone rubber composition for forming a templating mother mold adapted to mold a photo-curable liquid resin therein.

2. Prior Art

In a process for developing a new model of automobile part or household appliance, a certain number of products must be produced for the purpose of confirming the outer appearance, shape and performance. To this end, various procedures were developed in the prior art. Among others, a procedure of producing a precision part replica using a mold of silicone rubber, known as a vacuum casting procedure, is widely used in the art. In this procedure, a pattern of molding serving as a master model is prepared from a suitable material such as wood, plastics and metals by manual modeling or by means of a machine tool (which can be controlled on the basis of three-dimensional CAD data). It was recently developed to produce a master model by an optical shaping system of irradiating a UV laser beam to a photo-curable resin in accordance with three-dimensional CAD data inputs. In general, a replica is produced by burying the thus obtained master model in an addition/heat curable liquid silicone rubber composition, curing the silicone rubber composition, removing the master model, casting a thermosetting resin into the cavity in the cured silicone rubber where the master model has been removed, heating the thermosetting resin for curing.

What is desired in the art is to produce such replicas within a short time. Attempts to meet such expectation have been made. For example, JP-A 114711/1991 discloses a method for producing a molded part by introducing a UV-curable liquid resin (epoxy or acrylic reactive resin) into a mold made of a transparent addition room temperature vulcanizable (RTV) silicone rubber composition, and irradiating UV to the liquid resin for curing. To cause the addition RTV liquid silicone rubber composition to cure, however, sufficient control of metering, agitating and curing steps is necessary. In particular, the curing conditions must be strictly controlled in order to increase the dimensional precision of a molded part. The curing usually takes 6 to 24 hours, suggesting that the process is unsatisfactory with respect to the manufacturing time.

An attempt to form a mother mold through photo-curing is disclosed in JP-A 205157/1995. The mold prepared from a photo-curable organic resin is a hard mold, and the resin to be cured in the mold is a conventional thermosetting resin rather than a photo-curable resin.

Therefore, an object of the invention is to provide a photo-curable liquid silicone rubber composition for forming a templating mother mold adapted to form a replica by casting a photo-curable liquid resin therein, the composition allowing the templating mother mold to be formed through simple operation within a short time while the resultant mother mold allowing the photo-curable liquid resin cast therein to be cured with light transmitted by the mother mold.

SUMMARY OF THE INVENTION

We have found that when a photo-curable liquid silicone rubber composition as typified by first to third preferred embodiments to be described later is exposed to light, especially UV light having a wavelength of 200 to 500 nm, it forms a cured product having a Shore A hardness of 20 to 60 and a light (or actinic radiation) transmittance of at least 10% as measured at a wall gage of 10 mm. The cured product serving as a templating mother mold can be molded through simple operation within a short time. When a photo-curable liquid resin is cast into the mother mold, light or actinic radiation, especially UV light having a wavelength of 200 to 500 nm can be irradiated to the photo-curable liquid resin through the mother mold whereby the liquid resin is photo-cured within the mother mold obtained by curing of the photo-curable liquid silicone rubber composition.

According to the present invention, there is provided a photo-curable liquid silicone rubber composition for a templating mother mold adapted to mold a photo-curable liquid resin therein, which is curable upon exposure to light into a cured product having a Shore A hardness of 20 to 60 and a light transmittance of at least 10% as measured at a wall gage of 10 mm.

Preferably the composition cures with light having a wavelength of 200 to 500 nm.

A first preferred embodiment provides a photo-curable liquid silicone rubber composition comprising 100 parts by weight of an organopolysiloxane and 0.01 to 5 parts by weight of a photo-initiator, the organopolysiloxane consisting of (A) 30 to 100% by weight of an organopolysiloxane of the following average compositional formula (1):

$$R_a R^1_b SiO_{(4-a-b)/2} \qquad (1)$$

wherein R, which is identical or different, is a substituted or unsubstituted monovalent hydrocarbon group free of an aliphatic unsaturated bond or an alkoxy group; $R^1$, which is identical or different, is a photo-reactive group selected from a (meth)acryloyl-containing group, vinyloxyalkyl group, and epoxy-containing group; and letters a and b are positive numbers satisfying $1.90 \leq a < 2.40$, $0.0003 \leq b \leq 0.10$, and $1.90 < a+b \leq 2.40$, the organopolysiloxane containing at least two photo-reactive groups in a molecule and having a viscosity of 100 to 1,000,000 centipoise at 25° C., and (B) 0 to 70% by weight of a silicone resin comprising $R_p R^1_q SiO_{1/2}$ units (M), $SiO_2$ units (Q), and/or $XSiO_{3/2}$ units (T) wherein R and $R^1$ are as defined above, letters p and q each are equal to 0, 1, 2 or 3 and satisfy p+q=3, X is selected from R and $R^1$, molar ratio M/(Q+T)=0.6 to 1.2, and molar ratio $R^1/Si=0.01$ to 0.10, the silicone resin being soluble in component (A).

A second preferred embodiment provides a photo-curable liquid silicone rubber composition comprising 100 parts by weight of an organopolysiloxane and 0.01 to 5 parts by weight of a photo-initiator, the organopolysiloxane consisting of (C) 30 to 100% by weight of an organopolysiloxane of the following average compositional formula (2):

$$R_c R^2_d SiO_{(4-c-d)/2} \qquad (2)$$

wherein R, which is identical or different, is a substituted or unsubstituted monovalent hydrocarbon group free of an aliphatic unsaturated bond or an alkoxy group; $R^2$, which is identical or different, is an aliphatic unsaturated group selected from an alkenyl group and an oxygen atom-containing aliphatic unsaturated group; and letters c and d are positive numbers satisfying $1.90 \leq c < 2.40$, 0.0003≦d≦0.10, and 1.90<c+d≦2.40, the organopolysiloxane containing at least two aliphatic unsaturated groups in a molecule and having a viscosity of 100 to 1,000,000 centipoise at 25° C., and (D) 0 to 70% by weight of a silicone resin comprising $R_pR^2_qSiO_{1/2}$ units (M), $SiO_2$ units (Q), and/or $YSiO_{3/2}$ units (T) wherein R and $R^2$ are as defined above, letters p and q each are equal to 0, 1, 2 or 3 and satisfy p+q=3, Y is selected from R and $R^2$, molar ratio M/(Q+T)=0.6 to 1.2, and molar ratio $R^2$/Si=0.01 to 0.10, the silicone resin being soluble in component (C), the composition further comprising (E) an organosilane or organosiloxane containing at least two mercapto groups in a molecule in such an amount that the equivalent of mercapto group may be 0.1 to 20 relative to the aliphatic unsaturated group supplied from components (C) and (D).

A third preferred embodiment provides a photo-curable liquid silicone rubber composition comprising an organopolysiloxane consisting of (C) 30 to 100% by weight of an organopolysiloxane of the following average compositional formula (2):

$$R_cR^2_dSiO_{(4-c-d)/2} \quad (2)$$

wherein R, which is identical or different, is a substituted or unsubstituted monovalent hydrocarbon group free of an aliphatic unsaturated bond or an alkoxy group; $R^2$, which is identical or different, is an aliphatic unsaturated group selected from an alkenyl group and an oxygen atom-containing aliphatic unsaturated group; and letters c and d are positive numbers satisfying 1.90≦c<2.40, 0.0003≦d≦0.10, and 1.90<c+d≦2.40, the organopolysiloxane containing at least two aliphatic unsaturated groups in a molecule and having a viscosity of 100 to 1,000,000 centipoise at 25° C., and (D) 0 to 70% by weight of a silicone resin comprising $R_pR^2_qSiO_{1/2}$ units (M), $SiO_2$ units (Q), and/or $YSiO_{3/2}$ units (T) wherein R and $R^2$ are as defined above, letters p and q each are equal to 0, 1, 2 or 3 and satisfy p+q=3, Y is selected from R and $R^2$, molar ratio M/(Q+T)=0.6 to 1.2, and molar ratio $R^2$/Si=0.01 to 0.10, the silicone resin being soluble in component (C), the composition further comprising (F) an organohydrogenpolysiloxane of the following average compositional formula (3):

$$R_eH_fSiO_{(4-e-f)/2} \quad (3)$$

wherein R, which is identical or different, is a substituted or unsubstituted monovalent hydrocarbon group free of an aliphatic unsaturated bond or an alkoxy group, letters e and f are positive numbers satisfying 0.70≦e≦2.69, 0.01≦f≦1.20, and 1.5≦e+f≦2.7, the organohydrogenpolysiloxane containing at least two SiH groups in a molecule, in such an amount that 0.4 to 10 SiH groups are available per aliphatic unsaturated group supplied from components (C) and (D), and (G) a catalytic amount of a platinum catalyst for effecting hydrosilylation between the aliphatic unsaturated groups in components (C) and (D) and the SiH group in component (F) upon light exposure.

DESCRIPTION OF THE PREFERRED EMBODIMENTS

A photo-curable liquid silicone rubber composition for forming a templating mother mold according to the present invention is a photo-curable composition comprising an organopolysiloxane as a main component. The photo-curable liquid silicone rubber composition cures upon exposure to light into a cured product having a Shore A hardness of 20 to 60 and a light transmittance of at least 10% as measured at a wall gage of 10 mm. Note that the cured product serves as a mother mold for molding a photo-curable liquid resin therein to form a replica.

The cured product resulting from the photo-curable liquid silicone rubber composition should have a Shore A hardness of 20 to 60, more preferably 30 to 50. With a mold hardness of less than 20 in Shore A, there would be formed replicas of insufficient precision. With a mold hardness of more than 60 in Shore A, it would become difficult to remove a replica of complex shape such as having inverted taper. The cured mold must be transmissive to actinic radiation in order that the photo-curable liquid resin cast in the mold cavity be cured with the actinic radiation. The cured mold should have an actinic radiation transmittance of at least 10% T as measured at a mold gage of 10 mm. With a transmittance of less than 10% T, insufficient light is transmitted by a silicone rubber mold having a wall gage of several tens of millimeter so that the photo-curable liquid resin in the mold cavity might be insufficiently cured, restraining removal of the cured product from the mother mold. It is understood that the silicone rubber mother mold prepared as above may also be used in molding replicas from thermosetting resins by conventional vacuum casting methods.

Broadly stated, the inventive composition may be any of photo-curable liquid silicone rubber compositions which are curable upon exposure to light into a cured product having a Shore A hardness of 20 to 60 and a transmittance of incident actinic radiation of at least 10% T at a wall gage of 10 mm. Preferred are first to third photo-curable liquid silicone rubber compositions to be described below.

First Photo-Curable Liquid Silicone Rubber Composition

The first photo-curable liquid silicone rubber composition is comprised of (i) 100 parts by weight of an organopolysiloxane and (ii) 0.01 to 5 parts by weight of a photo-initiator. The organopolysiloxane (i) consists of (A) 30 to 100% by weight of an organopolysiloxane of the following average compositional formula (1):

$$R_aR^1_bSiO_{(4-a-b)/2} \quad (1)$$

wherein R, which is identical or different, is a substituted or unsubstituted monovalent hydrocarbon group free of an aliphatic unsaturated bond or an alkoxy group; $R^1$, which is identical or different, is a photo-reactive group selected from a (meth)acryloyl-containing group, vinyloxyalkyl group, and epoxy-containing group; and letters a and b are positive numbers satisfying 1.90≦a<2.40, 0.0003≦b≦0.10, and 1.90<a+b≦2.40, the organopolysiloxane containing at least two photo-reactive groups in a molecule and having a viscosity of 100 to 1,000,000 centipoise at 25° C., and (B) 0 to 70% by weight of a silicone resin comprising $R_pR^1_qSiO_{1/2}$ units (M), $SiO_2$ units (Q), and/or $XSiO_{3/2}$ units (T) wherein R and $R^1$ are as defined above, letters p and q each are equal to 0, 1, 2 or 3 and satisfy p+q=3, X is selected from R and $R^1$, molar ratio M/(Q+T)=0.6 to 1.2, and molar ratio $R^1$/Si32 0.01 to 0.10, the silicone resin being soluble in component (A).

In the organopolysiloxane of formula (1) constituting component (A), the monovalent hydrocarbon groups represented by R are preferably those having 1 to 10 carbon atoms, especially 1 to 8 carbon atoms, for example, alkyl groups such as methyl, ethyl, propyl, isopropyl, butyl, isobutyl, tert-butyl, pentyl, hexyl, octyl, and decyl, cycloalkyl groups such as cyclopentyl and cyclohexyl, aryl groups such as phenyl and tolyl, and aralkyl groups such as benzyl and phenylethyl. The alkoxy groups represented by R are preferably those having 1 to 8 carbon atoms, especially 1 to 4 carbon atoms, for example, methoxy, ethoxy, propoxy, and butoxy. R is not limited to these unsubstituted monovalent hydrocarbon groups and alkoxy groups, but includes substituted ones of these groups wherein some or all of the hydrogen atoms each attached to a carbon atom are replaced by halogen atoms, cyano groups, alkoxy groups or the like, for example, substituted hydrocarbon groups such as chloromethyl, 3,3,3-trifluoropropyl, and cyanoethyl and substituted alkoxy groups.

$R^1$ is a photo-reactive group selected from a (meth) acryloyl-containing group, vinyloxyalkyl group, and epoxy-containing group. The (meth)acryloyl-containing groups include (meth)acryloxyalkyl groups wherein the alkyl moiety has 1 to 8 carbon atoms such as γ-acryloxypropyl and γ-methacryloxypropyl. The vinyloxyalkyl groups include those groups wherein the alkyl moiety has 3 to 8 carbon atoms such as vinyloxypropyl. The epoxy-containing groups include glycidoxyalkyl groups wherein the alkyl moiety has 3 to 8 carbon atoms such as γ-glycidoxypropyl and (3,4-epoxycyclohexyl)alkyl groups wherein the alkyl moiety has 2 to 8 carbon atoms such as β-(3,4-epoxycyclohexyl)ethyl.

At least two, preferably 2 to about 10, photo-reactive groups represented by $R^1$ should be contained in a molecule. With less than two photo-reactive groups represented by $R^1$, organopolysiloxanes are not curable. It is noted that $R^1$ may be attached to a silicon atom at an end of or intermediate a molecular chain.

The photo-reactive groups are classified in terms of their reaction mode into two types, radical reactive groups and cation reactive groups. Among the above-mentioned photo-reactive groups, the (meth)acryloyl-containing groups belong to the radical reactive groups while the vinyloxyalkyl and epoxy-containing groups belong to the cation reactive groups. Among these, products cured through cationic reaction leave in the cured silicone rubber cationic residues, which can largely affect the heat resistance of silicone rubber and hence, the effective life of a mold. A choice of the radical reactive groups is recommended from this aspect.

Letters a and b are positive numbers satisfying $1.90 \leq a < 2.40$, preferably $1.95 \leq a \leq 2.05$, $0.0003 \leq b \leq 0.10$, preferably $0.0005 \leq b \leq 0.05$, and $1.90 < a+b \leq 2.40$, preferably $1.96 \leq a+b \leq 2.1$. The organopolysiloxane of formula (1) may be linear or branched. Its molecular chain is end-blocked with a triorganosiloxy group which may or may not contain one to three photo-reactive groups $R^1$ such as $R_3SiO-$, $R^1R_2SiO-$, $R^1{}_2RSiO-$, and $R^1{}_3SiO-$ groups.

The organopolysiloxane has a viscosity of 100 to 1,000,000 centipoise at 25° C., preferably 500 to 100,000 centipoise at 25° C. Organopolysiloxanes having a viscosity of less than 100 centipoise fail to provide rubbery nature and are brittle whereas organopolysiloxanes having a viscosity of more than 1,000,000 centipoise are too viscous to handle as a liquid composition.

The organopolysiloxanes of formula (1) can be synthesized by well-known methods. Organopolysiloxanes having an acryloyl group, for example, can be prepared by a method of attaching γ-acryloxypropyltrimethoxysilane to a diorganopolysiloxane terminated with a hydroxydimethylsilyl group at each end through dealcoholysis condensation, a method of attaching γ-acryloxymethyldimethylsilanol to a diorganopolysiloxane terminated with a trimethoxysilyl group at each end through dealcoholysis condensation, and a method of effecting equilibration between a hydrolyzate of γ-acryloxypropylmethyldimethoxysilane and octamethylcyclotetrasiloxane in the presence of a catalyst. By any of these methods, a diorganopolysiloxane having an acryl group introduced in a side chain is available and useful as component (A).

The silicone resin (B) is a component for imparting strength to the composition and concurrently increasing the hardness thereof. More particularly, since the silicone rubber composition as used herein cures into a product which must subsequently transmit light, high loading of reinforcing fillers used in conventional silicone rubbers is impossible. For this reason, the silicone resin becomes essential when it is desired to provide strength as typified by tensile strength and tear strength. The silicone resin has tri- and tetra-functional siloxane bonds and is soluble in component (A).

More illustratively, the silicone resin contains $R_pR^1{}_qSiO_{1/2}$ units (M), $SiO_2$ units (Q), and/or $XSiO_{3/2}$ units (T). The silicone resin may further contain $R_sR^1{}_tO_{2/2}$ units (D) in a molecule. R and $R^1$ are as defined above, and X is R or $R^1$. Letters p and q each are equal to 0, 1, 2 or 3 and satisfy p+q=3. Letters s and t each are equal to 0, 1 or 2 and satisfy s+t=2.

The molar ratio of M unit to T and Q units combined, that is, M/(Q+T) is from 0.6 to 1.2, preferably from 0.7 to 1.1. Silicone resins with a molar ratio M/(Q+T) of less than 0.6 are insoluble in component (A) and not reinforcing, or become white turbid and less transmissive to light. A molar ratio M/(Q+T) of more than 1.2 suggests a reduction of silica structure, failing to provide the reinforcing effect.

In order that silicone resin (B) exert the reinforcing effect, it must be integrated with component (A) after crosslinking. For this reason, silicone resin (B) must partially contain a photo-reactive group represented by $R^1$ as does component (A). The content of photo-reactive group $R^1$ is in the range of 0.01 to 0.1 mol, preferably 0.02 to 0.08 mol per mol of silicon atom contained in the silicone resin. A silicone resin with a $R^1$ content of less than 0.01 mol is not incorporated in crosslinkages, resulting in a cured product retaining surface tack. A silicone resin with a $R^1$ content of more than 0.1 mol is too hard and results in a cured product losing elasticity and becoming brittle.

The silicone resin is synthesized, for example, by hydrolyzing γ-acryloxypropyltrimethoxysilane and tetramethoxysilane in such a ratio as to meet the above-mentioned composition. Alternatively, the silicone resin can be obtained by reacting residual silanol of a conventionally prepared silicone resin with γ-acryloxypropyltrimethoxysilane or chlorosilane.

The blend of components (A) and (B) is 30 to 100% by weight, especially 50 to 90% by weight of component (A) and 0 to 70% by weight, especially 10 to 50% by weight of component (B) provided that the total of components (A) and (B) is 100% by weight. Component (B) need not be added in some applications where no strength is necessary. Compositions containing more than 70% by weight of component (B) have an increased viscosity, cease to be liquid, and cure into brittle parts which are practically unacceptable.

The first composition is based on (i) an organopolysiloxane consisting of the above-mentioned components (A) and (B) and (ii) a photo-initiator. The photo-initiator is to trigger reaction of component (i) upon light exposure to create a three-dimensional linkage, forming a rubber molding. Among the above-mentioned photo-reactive groups, an organopolysiloxane bearing (meth)acryloyl-containing groups undergoes curing through radical reaction whereas an organopolysiloxane bearing epoxy or vinylether groups undergoes curing through cationic reaction. In this sense, the photo-initiators include radical initiators and cationic initiators. Examples of the radical initiator include acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenol)ketone, benzyl methoxyketal, and 2-chlorothioxanthone. Useful known examples of the cationic photo-polymerization initiator include diazonium salts such as 4-morpholino-2,5-dimethoxyphenyl diazonium fluoroborate, and iodonium salts such as a diphenyl iodonium salt of arsenic hexafluoride and an octoxyphenylphenyl iodonium salt of antimony hexafluoride.

The photo-initiator (ii) is added in an amount of 0.01 to 5 parts by weight per 100 parts by weight of component (i), that is, components (A) and (B) combined. Since the silicone rubber composition must play the role of transmitting light at the end of curing, the addition of photo-initiator (ii) which essentially absorbs light becomes a negative factor with respect to light transmission. Therefore, the photo-initiator (ii) should preferably be added in a minimum amount enough for the composition to cure, more preferably in an amount of 0.01 to 0.5 part by weight per 100 parts by weight of component (i). Less than 0.01 part of photo-initiator (ii) is insufficient to cause the silicone rubber composition to cure or to form a mold. With more than 5 parts of photo-initiator (ii), the silicone rubber composition would cure into a mold which is less transmissive to light so that a long time is taken in subsequent curing of the photo-curable resin within the mold, that is, the resulting mold is an inadequately light transmissive mold.

Second Photo-Curable Liquid Silicone Rubber Composition

The second photo-curable liquid silicone rubber composition is comprised of (iii) an organopolysiloxane and (iv) a photo-initiator. The organopolysiloxane (iii) consists of (C) 30 to 100% by weight of an organopolysiloxane of the following average compositional formula (2):

wherein R, which is identical or different, is a substituted or unsubstituted monovalent hydrocarbon group free of an aliphatic unsaturated bond or an alkoxy group; $R^2$, which is identical or different, is an aliphatic unsaturated group selected from an alkenyl group and an oxygen atom-containing aliphatic unsaturated group; and letters c and d are positive numbers satisfying $1.90 \leq c < 2.40$, $0.0003 \leq d \leq 0.10$, and $1.90 < c+d \leq 2.40$, the organopolysiloxane containing at least two aliphatic unsaturated groups in a molecule and having a viscosity of 100 to 1,000,000 centipoise at 25° C., and (D) 0 to 70% by weight of a silicone resin comprising $R_pR^2_qSiO_{1/2}$ units (M), $SiO_2$ units (Q), and/or $YSiO_{3/2}$ units (T) wherein R and $R^2$ are as defined above, letters p and q each are equal to 0, 1, 2 or 3 and satisfy p+q=3, Y is selected from R and $R^2$, molar ratio M/(Q+T)=0.6 to 1.2, and molar ratio $R^2$/Si=0.01 to 0.10, the silicone resin being soluble in component (C). The composition further contains (E) an organosilane or organosiloxane containing at least two mercapto groups in a molecule in such an amount that the equivalent of mercapto group may be 0.1 to 20 relative to the aliphatic unsaturated group supplied from components (C) and (D).

In the organopolysiloxane of formula (2), R is as defined for R in the first composition. $R^2$ is at least one aliphatic unsaturated group selected from an alkenyl group and an oxygen atom-containing aliphatic unsaturated group, preferably having 2 to 10 carbon atoms, especially 2 to 6 carbon atoms. Examples of the group represented by $R^2$ include alkenyl groups such as vinyl, allyl, propenyl, and hexenyl, alkenyloxyalkyl groups (preferably excluding vinyloxyalkyl groups) such as allyloxypropyl, and alkenyloxy groups such as propenoxy.

At least two, preferably 2 to about 10, aliphatic unsaturated groups represented by $R^2$ should be contained in a molecule. With less than two aliphatic unsaturated groups represented by $R^2$, organopolysiloxanes are not curable. It is noted that $R^2$ may be attached to a silicon atom at an end of or intermediate a molecular chain.

Letters c and d are positive numbers satisfying $1.90 \leq c < 2.40$, preferably $1.95 \leq c \leq 2.05$, $0.0003 \leq d \leq 0.10$, preferably $0.0005 \leq d \leq 0.05$, and $1.90 < c+d \leq 2.40$, preferably $1.96 \leq c+d \leq 2.1$. The organopolysiloxane of formula (2) may be linear or branched. Its molecular chain is end-blocked with a triorganosiloxy group which may or may not contain one to three aliphatic unsaturated groups $R^2$ such as $R_3SiO$—, $R^2R_2SiO$—, $R^2_2RSiO$—, and $R^2_3SiO$— groups.

The organopolysiloxane of formula (2) has a viscosity of 100 to 1,000,000 centipoise at 25° C., preferably 500 to 100,000 centipoise at 25° C. Organopolysiloxanes having a viscosity of less than 100 centipoise fail to provide rubbery nature and are brittle whereas organopolysiloxanes having a viscosity of more than 1,000,000 centipoise are too viscous to handle as a liquid composition.

Like the silicone resin (B), the silicone resin (D) is a component for imparting strength to the composition and concurrently increasing the hardness thereof. More particularly, since the silicone rubber composition as used herein cures into a product which must subsequently transmit light, high loading of reinforcing fillers used in conventional silicone rubbers is impossible. For this reason, the silicone resin becomes essential when it is desired to provide strength as typified by tensile strength and tear strength. The silicone resin has tri- and tetra-functional siloxane bonds and is soluble in component (C).

More illustratively, the silicone resin contains $R_pR^2_qSiO_{1/2}$ units (M), $SiO_2$ units (Q), and/or $YSiO_{3/2}$ units (T). The silicone resin may further contain $R_sR^2_tO_{2/2}$ units (D) in a molecule. R and $R^2$ are as defined above, and Y is R or $R^2$. Letters p and q each are equal to 0, 1, 2 or 3 and satisfy p+q=3. Letters s and t each are equal to 0, 1 or 2 and satisfy s+t=2.

The molar ratio of M unit to T and Q units combined, that is, M/(Q+T) is from 0.6 to 1.2, preferably from 0.7 to 1.1. Silicone resins with a molar ratio M/(Q+T) of less than 0.6 are insoluble in component (C) and not reinforcing, or become white turbid and less transmissive to light. A molar ratio M/(Q+T) of more than 1.2 suggests a reduction of silica structure, failing to provide the reinforcing effect.

In order that silicone resin (D) exert the reinforcing effect, it must be integrated with component (C) after crosslinking. For this reason, silicone resin (D) must partially contain an aliphatic unsaturated group represented by $R^2$ as does component (C). The content of aliphatic unsaturated group $R^2$ is in the range of 0.01 to 0.1 mol per mol of silicon atom contained in the silicone resin. A silicone resin with a $R^2$ content of less than 0.01 mol is not incorporated in crosslinkages, resulting in a cured product retaining surface tack. A silicone resin with a $R^2$ content of more than 0.1 mol is too hard and results in a cured product losing elasticity and becoming brittle.

The silicone resin is synthesized, for example, by hydrolyzing vinyltrimethoxysilane and tetramethoxysilane in such a ratio as to meet the above-mentioned composition.

Alternatively, the silicone resin can be obtained by reacting residual silanol of a conventionally prepared silicone resin with vinyltrimethoxysilane or chlorosilane. Furthermore, the silicone resin can also be obtained by hydrolyzing water glass or tetraethoxysilane and reacting the hydrolyzate with 1,3-divinyl-1,1,3,3-tetramethyldisiloxane.

Components (C) and (D) are blended such that the blend is 30 to 100% by weight, especially 50 to 90% by weight of component (C) and 0 to 70% by weight, especially 10 to 50% by weight of component (D) provided that the total of components (C) and (D) is 100% by weight. Component (D) need not be added in some applications where no strength is necessary. Compositions containing more than 70% by weight of component (D) have an increased viscosity, cease to be liquid, and cure into brittle parts which are practically unacceptable.

Contained as component (E) in the second composition is an organosilane or organosiloxane containing at least two, preferably 2 to about 50, mercapto groups in a molecule. This organosilane or organosiloxane (E) is a crosslinking component which reacts with aliphatic unsaturated groups in components (C) and (D) to form a rubbery elastomer. Any desired compound may be used insofar as it contains in a molecule at least two mercapto groups, for example, mercaptoalkyl groups represented by —$(CH_2)_r$—SH wherein r is 1 to 6, such as γ-mercaptopropyl. To maintain light transparency, the compound should have a silane or siloxane bond well compatible with the organopolysiloxane.

Illustrative examples of the organosilane or organosiloxane (E) are linear, cyclic or branched organopolysiloxanes of the following formulae.

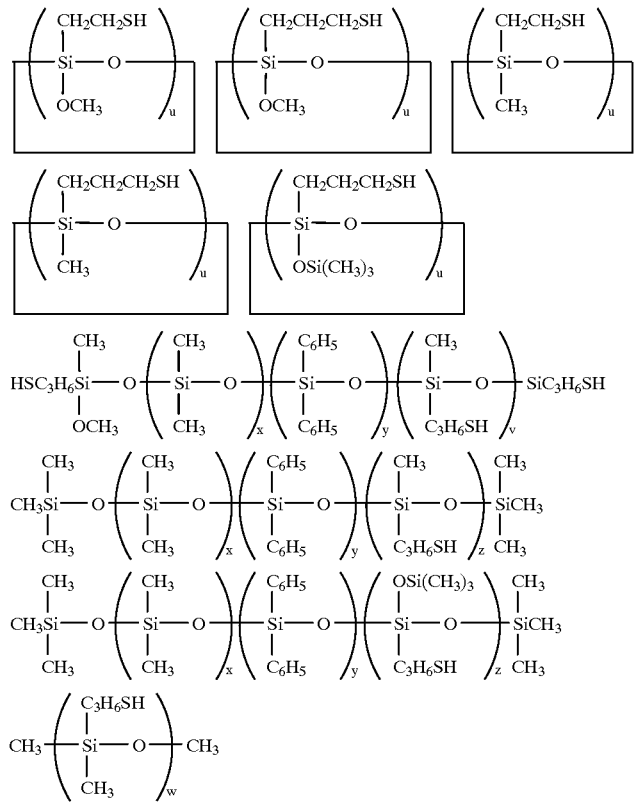

In the formulae, letter u is an integer of at least 3, x, y and v are integers inclusive of 0, and z and w are integers of at least 2.

These organosiloxanes may be used alone or in admixture of two or more.

As component (E), linear compounds are often used because of ease of synthesis as mentioned above although compounds of the structure containing Q units, for example, a hydrolyzate of γ-mercaptopropyltrimethoxysilane and tetramethoxysilane may also be used.

Component (E) is blended in such an amount that the equivalent of mercapto group may be 0.1 to 20, preferably 0.5 to 4.0, relative to the aliphatic unsaturated group supplied from components (C) and (D). Insufficient curing occurs with less than 0.1 equivalent whereas beyond 20 equivalents, the crosslinking agent becomes excessive, also leading to insufficient curing.

The second composition is based on (iii) an organopolysiloxane consisting of the above-mentioned components (C) and (D), component (E), and (iv) a photo-initiator. The photo-initiator is to trigger reaction of component (iii) upon light exposure to create a three-dimensional linkage, forming a rubber molding. Examples of the photo-initiator include acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4-dimethoxybenzophenone, 4-chloro-4-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenol)ketone, benzyl methoxyketal, and 2-chlorothioxanthone.

The photo-initiator (iv) is added in an amount of 0.01 to 5 parts by weight per 100 parts by weight of component (iii). Since the silicone rubber composition must play the role of transmitting light at the end of curing, the addition of photo-initiator (iv) which essentially absorbs light becomes a negative factor with respect to light transmission. Therefore, the photo-initiator (iv) should preferably be added in a minimum amount enough for the composition to cure, more preferably in an amount of 0.01 to 0.5 part by weight per 100 parts by weight of component (iii). Less than 0.01 part of photo-initiator (iv) is insufficient to cause the silicone rubber composition to cure or to form a mold. With more than 5 parts of photo-initiator (iv), the silicone rubber composition would cure into a mold which is less transmissive to light so that a long time is taken in subsequent curing of the photo-curable resin within the mold, that is, the resulting mold is an inadequately light transmissive mold.

Third Photo-Curable Liquid Silicone Rubber Composition

The third photo-curable liquid silicone rubber composition is comprised of an organopolysiloxane consisting of (C) 30 to 100% by weight of an organopolysiloxane of the following average compositional formula (2):

$$R_c R^2_d SiO_{(4-c-d)/2} \quad (2)$$

wherein R, which is identical or different, is a substituted or unsubstituted monovalent hydrocarbon group free of an aliphatic unsaturated bond or an alkoxy group; $R^2$, which is identical or different, is an aliphatic unsaturated group selected from an alkenyl group and an oxygen atom-containing aliphatic unsaturated group; and letters c and d are positive numbers satisfying $1.90 \leq c < 2.40$, $0.0003 \leq d \leq 0.10$, and $1.90 < c+d \leq 2.40$, the organopolysiloxane containing at least two aliphatic unsaturated groups in a molecule and having a viscosity of 100 to 1,000,000 centipoise at 25° C., and (D) 0 to 70% by weight of a silicone resin comprising $R_p R^2_q SiO_{1/2}$ units (M), $SiO_2$ units (Q), and/or $YSiO_{3/2}$ units (T) wherein R and $R^2$ are as defined above, letters p and q each are equal to 0, 1, 2 or 3 and satisfy p+q=3, Y is selected from R and $R^2$, molar ratio M/(Q+T)=0.6 to 1.2, and molar ratio $R^2/Si$=0.01 to 0.10, the silicone resin being soluble in component (C). The composition further contains (F) an organohydrogenpolysiloxane of the following average compositional formula (3):

$$R_e H_f SiO_{(4-e-f)/2} \quad (3)$$

wherein R, which is identical or different, is a substituted or unsubstituted monovalent hydrocarbon group free of an aliphatic unsaturated bond or an alkoxy group, letters e and f are positive numbers satisfying $0.70 \leq e \leq 2.69$, $0.01 \leq f \leq 1.20$, and $1.5 \leq e+f \leq 2.7$, the organohydrogenpolysiloxane containing at least two SiH groups in a molecule, in such an amount that 0.4 to 10 SiH groups are available per aliphatic unsaturated group supplied from components (C) and (D), and (G) a catalytic amount of a platinum catalyst for effecting hydrosilylation between the aliphatic unsaturated groups in components (C) and (D) and the SiH group in component (F) upon light exposure.

The identity and blending proportion of components (C) and (D) are as described in conjunction with the second composition.

In addition to components (C) and (D), the third composition contains an organohydrogenpolysiloxane of formula (3) as component (F). This organohydrogenpolysiloxane serves as a crosslinking agent for undergoing hydrosilylation with the organopolysiloxane, more specifically aliphatic unsaturated groups in components (C) and (D) in the presence of the platinum catalyst for thereby promoting crosslinking to form a rubbery elastomer.

In formula (3), R is as defined for R in formula (1). Letters e and f are positive numbers satisfying $0.70 \leq e \leq 2.69$, preferably $1.0 \leq e \leq 2.0$, $0.01 \leq f \leq 1.20$, preferably $0.02 \leq f \leq 1.1$, and $1.5 \leq e+f \leq 2.7$, preferably $1.9 \leq e+f \leq 2.4$. This organohydrogenpolysiloxane may be linear, branched, cyclic or three-dimensional network insofar as it has at least 2 SiH groups, preferably at least 3 SiH groups, more preferably 3 to about 100 SiH groups (hydrogen atoms each attached to a silicon atom). It is understood that SiH groups may be present at an end of or intermediate a molecular chain.

The organohydrogenpolysiloxane usually has a viscosity of about 2 to 1,000 centipoise at 25° C.

The organohydrogenpolysiloxane is blended in such an amount that 0.4 to 10 SiH groups, preferably 0.8 to 4 SiH groups are available per aliphatic unsaturated group supplied from components (C) and (D). Insufficient curing occurs with less than 0.4 equivalent whereas beyond 10 equivalents, the crosslinking agent becomes excessive, also leading to insufficient curing.

Further blended as component (G) in the third composition is a platinum catalyst. The platinum catalyst is preferably a photo-functional platinum catalyst which can give a sufficient pot-life in that after all the above-mentioned components are combined, no curing is induced until preparatory steps necessary to fabricate a silicone rubber mold such as mixing and casting steps are completed. Examples of the photo-functional platinum catalyst include ($\eta$-diolefin)($\sigma$-aryl)platinum complexes as disclosed in JP-A 168061/1984 corresponding to U.S. Pat. No. 4,530,879 and platinum compounds controlled with azodicarboxylic acid esters as disclosed in JP-B 50375/1988 corresponding to U.S. Pat. No. 4,640,939. Also useful are platinum compounds controlled with optical active diketones such as benzoylacetone and acetylene dicarboxylic acid esters and platinum catalysts included in photo-degradable organic resins. The platinum catalyst is not limited to these examples.

Component (G) is blended in a catalytic amount, often about 1 to 2,000 ppm, especially about 10 to 200 ppm of platinum metal.

It is understood that the first to third compositions mentioned above may further contain fumed silica, transparent glass beads, and quartz glass powder insofar as the light transmission effect is not impaired. Also a hydrosilylation controlling agent may be blended in the third composition.

The liquid silicone rubber composition preferably has a viscosity of about 100 to 1,000,000 centipoise at 25° C., more preferably about 1,000 to 100,000 centipoise at 25° C.

All the liquid silicone rubber compositions mentioned above cure upon exposure to light. The term "light" used herein designates actinic radiation capable of curing photo-curable liquid silicone rubber compositions and photo-curable liquid resins. The term "photo" is used in the same sense. Ultraviolet light having a wavelength of 200 to 500 nm, especially ultraviolet light having a wavelength of 300 to 400 nm is typically used although the wavelength is not critical insofar as light has a radiation curing ability. Light sources capable of emitting such light include UV fluorescent lamps, high pressure mercury vapor lamps, metal halide lamps, and xenon lamps although the light source is not critical insofar as it can emit actinic radiation capable of curing photo-curable liquid silicone rubber compositions and photo-curable liquid resins. UV fluorescent lamps are preferred light sources because of the cost and ease of handling.

The liquid silicone rubber composition of the invention is used to form a templating mother mold which is used for the molding of photo-curable liquid resins and rubber, for example, (meth)acrylic resins, epoxy resins, urethane (meth) acrylate resins, fluorinated acrylate resins, and silicone-acrylate copolymers. The overall process involves the step of making a master model, the step of forming a mother mold from the photo-curable liquid silicone rubber composition of the invention on the basis of the master model, and the step of casting a photo-curable liquid resin in the mother mold to form a replica.

The overall replica molding process using the photo-curable liquid silicone rubber composition of the invention is described. A pattern or master model is first produced. Any of conventional techniques used in the prior art replica molding method is applicable. The master model may be made of wood, plastics, metals and composite materials thereof. Useful master model configuring techniques include carving of a wood block and machining of a material by a machine tool. The material can also be machined into the desired shape by computer-aided manufacturing using three-dimensional CAD data. Further, the master model may be produced by machining a plastic material or assembling plastic material pieces. Alternatively, the master model may be produced using an optical shaping system wherein the information relating to the position and shape of contour surfaces of the master model is acquired by a three-dimensional CAD system, light is selectively irradiated to a photo-curable liquid organic resin composition at positions corresponding to the designed shape on the basis of the information for curing the resin composition to form a three-dimensional shape. The optical shaping system used herein may be a commercially available one, for example, Solid Creation System by D-MEC Co., SOUP by C-MET Co., SLA by Nippon 3D Systems K.K., and SOLIFORM by Teijin Seiki K.K.

The master model thus prepared is submerged in a photo-curable liquid silicone rubber composition which is filled in a container having at least one light transmissive side surface. Light is irradiated to the silicone rubber composition through the light transmissive side surface of the container to cure the silicone rubber composition into a transparent silicone rubber part in which the master model is embedded and which is to serve as a mother mold. The master model is then removed. The mother mold is formed of the photo-curable liquid silicone rubber composition as mentioned above, which is advantageous in that the time required to form the mother mold and hence, the replica is significantly reduced, as compared with conventional addition heat vulcanizable or room temperature vulcanizable silicone rubber compositions.

A photo-curable liquid resin is then filled into the mother mold of cured silicone rubber through a runner. Light is irradiated to the liquid resin through the transparent silicone rubber mother mold having a wall gage of several millimeters to several hundred millimeters using an irradiating apparatus as used in the curing of a silicone rubber composition, thereby curing the liquid resin within the mother mold. Thereafter, the cured resin or replica is taken out of the mother mold. The replica is produced in this way. By deaerating in vacuum the photo-curable liquid resin prior to the curing step, there can be obtained a more precise replica.

EXAMPLES

Examples of the invention are given below by way of illustration and not by way of limitation. All parts are by weight.

Example 1

A composition 1 was prepared by blending 75 parts of a dimethylpolysiloxane blocked with a vinyldimethylsiloxy group at each end and having a viscosity of 100,000 centipoise at 25° C., 25 parts of a silicone resin consisting of $CH_2=CH(CH_3)_2SiO_{1/2}$, $(CH_3)_3SiO_{1/2}$, and $SiO_2$ units in a molar ratio of the total of $CH_2=CH(CH_3)_2SiO_{1/2}$ and $(CH_3)_3SiO_{1/2}$ units to the $SiO_2$ units of 0.8, having a vinyl group equivalent of 0.9 mol/100 g, and soluble in the dimethylpolysiloxane, 7 parts of a mercapto-containing organopolysiloxane of the following formula (1) having a viscosity of 30 centipoise at 25° C., and 0.1 part of 2,2-diethoxyacetophenone.

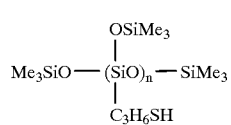

(1)

Example 2

A composition 2 was prepared by blending 75 parts of a polydimethylsiloxane end-blocked with an acryl-containing siloxy group of the following formula (2), to be abbreviated as Acryl-, hereinafter, and having a viscosity of 100 centipoise at 25° C., 25 parts of a silicone resin consisting of Acryl-$(CH_3)_2SiO_{1/2}$, $(CH_3)_3SiO_{1/2}$, and $SiO_2$ units in a molar ratio of the total of Acryl-$(CH_3)_2SiO_{1/2}$ and $(CH_3)_3SiO_{1/2}$ units to the $SiO_2$ units of 0.8, having an acryl group equivalent of 0.9 mol/100 g, and soluble in the dimethylpolysiloxane, and 1.0 part of 2,2-diethoxyacetophenone.

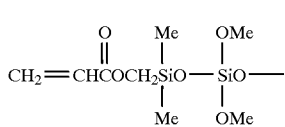

(2)

Example 3

A composition 3 was prepared by blending 75 parts of a dimethylpolysiloxane blocked with a vinyldimethylsiloxy group at each end and having a viscosity of 100,000 centipoise at 25° C., 25 parts of a silicone resin consisting of $CH_2=CH(CH_3)_2SiO_{1/2}$, $(CH_3)_3SiO_{1/2}$, and $SiO_2$ units in a molar ratio of the total of $CH_2=CH(CH_3)_2SiO_{1/2}$ and $(CH_3)_3SiO_{1/2}$ units to the $SiO_2$ units of 0.8, having a vinyl group equivalent of 0.9 mol/100 g, and soluble in the dimethylpolysiloxane, 7 parts of an organopolysiloxane consisting of $H(CH_3)_2SiO_{1/2}$, $H(CH_3)SiO_{1/2}$, $(CH_3)_3SiO_{1/2}$, and $SiO_2$ units and having a SiH group equivalent of 0.005 mol/g, and a sufficient amount of (1,5-cyclooctadiene) dimethyl platinum(II) to give 30 ppm of platinum based on the siloxane.

Comparative Example 1

A composition 4 was prepared by the same procedure as in Example 1 except that 7.0 parts of 2,2-diethoxyacetophenone was blended.

Using Compositions 1 to 4, the following experiment was carried out.

Preparation of a Master Model

Three-dimensional CAD data of a master model having a shrinkage factor of a photosensitive resin taken into account were produced. At the same time, data regarding a support portion for maintaining strength upon preparation of the master model by means of an optical shaping machine were produced. The master model was prepared by inputting the three-dimensional CAD data into an optical shaping system "SOLIFORM" manufactured by Teijin Seiki K.K., supplying a photo-curable resin TSR800, and irradiating UV laser beams at a pitch of 5 μm. To complete curing of the master model, the master model was exposed to UV from a UV fluorescent lamp for carrying out secondary curing.

Silicone Rubber Composition and Molding of a Mother Mold

Silicone rubber mother molds were prepared using the foregoing Compositions 1 to 4.

The support portion was removed by cutting from the master model obtained in the Preparation of a master model, obtaining a master model from which a replica was to be duplicated. A piece of tape was attached to a region of the master model where an opening or window was located.

A frame into which a photo-curable liquid silicone rubber composition was to be cast was prepared using a UV-transmissive acrylic resin. The master model was placed in the acrylic frame and secured thereto such that the master model was spaced a gap of 20 to 30 mm from the acrylic frame.

After each of the photo-curable liquid silicone rubber compositions 1 to 4 was previously deaerated in a vacuum tank for removing the air dissolved in the silicone rubber composition, the deaerated silicone rubber composition was cast into the acrylic frame in such a manner that there were entrained as few bubbles as possible until the frame was fully filled with the silicone rubber composition. The acrylic frame filled with the silicone rubber composition was placed in the vacuum tank again whereupon deaeration was performed.

The frame filled with the silicone rubber composition was placed in a rectangular exposure chamber where 40-W fluorescent lamps emitting UV at a center wavelength of 370 nm were disposed at six side walls. In this condition, the silicone rubber composition was exposed to UV for 10 minutes. The cured silicone rubber mold having the master model embedded therein was taken out of the acrylic frame. Using a surgical knife, the silicone rubber mold was cut into two sections whereupon the master model was removed therefrom. The cavity and core sections of the silicone rubber mold were again exposed to UV for 5 minutes under the UV fluorescent lamps for promoting curing. At this point, the silicone rubber mold faithfully reproduced the negative pattern of the master model. It was measured for surface hardness by a JIS A scale hardness meter.

Photo-Curable Resin and Molding of a Replica

Replicas were produced using the following photo-curable resin compositions 1 and 2.

Photo-Curable Resin Composition 1

An unsaturated polyurethane having a methacrylate group at each end and a number average molecular weight of 8,000 was obtained by reacting 1,000 g of polycaprolactone diol having a molecular weight of 500 with 410 g of tolylene diisocyanate to form an oligomer blocked with an isocyanate group at each end, and further reacting the oligomer with 410 g of 2-hydroxypropyl methacrylate.

A liquid photo-curable resin composition 1 having a viscosity of 80 poise at 25° C. was obtained by mixing 120 g of the unsaturated polyurethane, 40 g of 2-hydroxypropyl methacrylate, 20 g of N-methylol acrylamide, 20 g of methacrylamide, 5 g of α-methoxybenzoin methyl ether, and 0.2 g of 2,6-di-t-butyl-p-cresol.

Photo-Curable Resin Composition 2

An unsaturated polyester having an acid value of 35 mg KOH/g was obtained by mixing 430 g of diethylene glycol, 124 g of fumaric acid, 310 g of isophthalic acid, and 140 g of itaconic acid and effecting dehydrating condensation reaction.

A liquid photo-curable resin composition 2 having a viscosity of 120 poise at 25° C. was obtained by mixing 100 g of the unsaturated polyester, 20 g of hydroxypropyl methacrylate, 10 g of diacetone acrylamide, 10 g of diethylene glycol dimethacrylate, 3 g of α-methoxybenzoin methyl ether, and 0.2 g of 2,6-di-t-butyl-p-cresol.

The liquid photo-curable resin composition was preheated at 40° C. and deaerated under vacuum with stirring. The two sections of the photo-cured silicone rubber mold (obtained from the photo-curable liquid silicone rubber compositions 1 to 4) were mated to define the cavity, into which the liquid photo-curable resin composition was cast. The mold filled with the liquid photo-curable resin composition was placed in a rectangular exposure chamber where 40-W fluorescent lamps emitting UV at a center wavelength of 370 nm were disposed at six side walls, In this condition, the liquid photo-curable resin composition was exposed to UV for 10 minutes.

Thereafter, the mold was opened and a cured product of the liquid photo-curable resin composition was taken out as a replica. To complete the curing, the replica was placed in a rectangular exposure chamber where 40-w fluorescent lamps emitting UV at a center wavelength of 370 nm were disposed at six side walls. In this condition, the replica was exposed to UV for 5 minutes.

Replicas associated with the molds of photo-curable silicone rubber compositions 1 to 3 had a Shore D hardness of 82 degrees at 20° C. and faithfully reproduced the original shape.

In contrast, the mold of photo-curable silicone rubber composition 4 caused short curing of the liquid resin.

Sheets of 2 mm thick were prepared from photo-curable silicone rubber compositions 1 to 4 with a UV energy dose of 2,000 mJ/cm² and measured for rubber properties according to JIS K6301. The results are shown in Table 1.

Comparative Example 2

A mold and sheet were prepared from an addition curing type silicone rubber composition KE1606 by Shin-Etsu Chemical Co., Ltd. by effecting the same pretreatment as above and heat molding in a heating furnace. The hardness of the mold and the rubber properties of the sheet were measured.

Furthermore, using this silicone rubber composition, a similar process of master model making→mother mold forming→molding of photo-curable resin into a replica was carried out (working time 12 hours). This replica had a Shore D hardness of 82 degrees at 20° C. and faithfully reproduced the original shape.

Using this silicone rubber composition, a replica was produced as in Examples 1–3 and Comparative Example 1. This replica had a Shore D hardness of 65 degrees at 20° C. and faithfully reproduced the original shape.

The results are shown in Table 1.

TABLE 1

|  | E1 | E2 | E3 | CE1 | CE2 |
|---|---|---|---|---|---|
| Mold hardness (JIS A) | 34 | 55 | 33 | 34 | 31 |
| Hardness (JIS A) | 35 | 57 | 34 | 35 | 30 |
| Elongation (%) | 350 | 120 | 400 | 350 | 300 |
| Tensile strength (kgf/cm$^2$) | 33 | 45 | 35 | 33 | 40 |
| Tear strength (kgf/cm) | 6.8 | 9.5 | 7.5 | 6.8 | 6.7 |
| Light transmittance (% T) @ 370 nm | 37 | 40 | 36 | 2 | 90 |
| Curing time to form mold | 10 min. | 10 min. | 10 min. | 10 min. | 12 hr. |
| State of molded part | Good | Good | Good | Short curing | Good |

Light transmittance: sample gage 10 mm

Reference Example

An epoxy acrylate resin was prepared by blending 30 parts of bisphenol-A bis(2-hydroxypropyl)diacrylate, 20 parts of trimethylolpropane triacrylate, 1 part of octylphenol polyether alcohol, 10 parts of PMMA polymer particles (RCP1674 by E. I. duPont), 30 parts of boron nitride powder, and 2 parts of 2,2-dimethoxy-2-phenylacetophenone. The epoxy acrylate resin was cast into the silicone rubber molds prepared in Examples 1–3 and Comparative Examples 1–2, and then cured by irradiating UV light for 5 minutes through the silicone rubber mold from 40-W UV fluorescent lamps.

Satisfactory parts were molded in the molds of Examples 1–3 and Comparative Example 2 whereas the resin cast in the mold of Comparative Example 1 remained short cured. The parts molded in the molds of Examples 1–3 and Comparative Example 2 were easily released from the molds and had luster and high dimensional precision.

According to the invention, a photo-curable liquid silicone rubber composition can be cured with light to form a transparent templating mother mold which allows a photo-curable liquid resin cast therein to be cured with light transmitted by the mold wall through simple operation within a short time.

Although some preferred embodiments have been described, many modifications and variations may be made thereto in the light of the above teachings. It is therefore to be understood that within the scope of the appended claims, the invention may be practiced otherwise than as specifically described.

We claim:

1. A photo-curable liquid silicone rubber composition for a templating mother mold adapted to mold a photo-curable liquid resin therein, which comprises 100 parts by weight of an organopolysiloxane and 0.01 to 5 parts by weight of a photo-initiator, said organopolysiloxane consisting of (A) 30 to 100% by weight of an organopolysiloxane of the following average compositional formula (1):

$$R_a R^1_b SiO_{(4-a-b)/2} \qquad (1)$$

wherein R, which is identical or different, is a substituted or unsubstituted monovalent hydrocarbon group free of an aliphatic unsaturated bond or an alkoxy group; $R^1$, which is identical or different, is a photo-reactive group selected from a (meth)acryloyl-containing group, vinyloxyalkyl group, and epoxy-containing group; and letters a and b are positive numbers satisfying $1.90 \leq a < 2.40$, $0.0003 \leq b \leq 0.10$, and $1.90 < a+b \leq 2.40$, the organopolysiloxane containing at least two photo-reactive groups in a molecule and having a viscosity of 100 to 1,000,000 centipoise at 25° C., and (B) 0 to 70% by weight of a silicone resin comprising $R_p R^1_q SiO_{1/2}$ units (M), $SiO_2$ units (Q), and/or $XSiO_{3/2}$ units (T) wherein R and $R^1$ are as defined above, letters p and q each are equal to 0, 1, 2 or 3 and satisfy p+q=3, X is selected from R and $R^1$, molar ratio M/(Q+T)=0.6 to 1.2, and molar ratio $R^1$/Si=0.01 to 0.10, the silicone resin being soluble in component (A), said silicone rubber composition being curable upon exposure to light having a wavelength of 200 to 500 nm into a cured product having a Shore A hardness of 20 to 60 without silica and a light transmittance of at least 10% as measured at a thickness of 10 mm.

2. A photo-curable liquid silicone rubber for a templating mother mold adapted to mold a photo-curable liquid resin therein, which comprises 100 parts by weight of an organopolysiloxane and 0.01 to 5 parts by weight of a photo-initiator, said organopolysiloxane consisting of (C) 30 to 100% by weight of an organopolysiloxane of the following average compositional formula (2):

$$R_c R^2_d SiO_{(4-c-d)/2} \qquad (2)$$

wherein R, which is identical or different, is a substituted or unsubstituted monovalent hydrocarbon group free of an aliphatic unsaturated bond or an alkoxy group; $R^2$, which is identical or different, is an aliphatic unsaturated group selected from an alkenyl group and an oxygen atom-containing aliphatic unsaturated group; and letters c and d are positive numbers satisfying $1.90 \leq c < 2.40$, $0.0003 \leq d \leq 0.10$, and $1.90 < c+d \leq 2.40$, the organopolysiloxane containing at least two aliphatic unsaturated groups in a molecule and having a viscosity of 100 to 1,000,000 centipoise at 25° C., and (D) 0 to 70% by weight of a silicone resin comprising $R_p R^2_q SiO_{1/2}$ units (M), $SiO_2$ units (Q), and/or $YSiO_{3/2}$ units (T) wherein R and $R^2$ are as defined above, letters p and q each are equal to 0, 1, 2 or 3 and satisfy p+q=3, Y is selected from R and $R^2$, molar ratio M/(Q+T)=0.6 to 1.2, and molar ratio $R^2$/Si=0.01 to 0.10, the silicone resin being soluble in component (C), the composition further comprising (E) an organosilane or organosiloxane containing at least two mercapto groups in a molecule in such an amount that the equivalent of mercapto group may be 0.1 to 20 relative to the aliphatic unsaturated group supplied from components (C) and (D), said silicone rubber composition being curable upon exposure to light having a wavelength of 200 to 500 nm into a cured product having a Shore A hardness of 20 to 60 without silica and a light transmittance of at least 10% as measured at a thickness of 10 mm.

3. A composition as in claim 2 which comprises 10–50% by weight of (D).

4. A photo-curable liquid silicone rubber composition for a templating mother mold adapted to mold a photo-curable liquid resin therein, which comprises an organopolysiloxane consisting of (C) 30 to 100% by weight of an organopolysiloxane of the following average compositional formula (2):

$$R_cR^2_dSiO_{(4-c-d)/2} \quad (2)$$

wherein R, which is identical or different, is a substituted or unsubstituted monovalent hydrocarbon group free of an aliphatic unsaturated bond or an alkoxy group; $R^2$, which is identical or different, is an aliphatic unsaturated group selected from an alkenyl group and an oxygen atom-containing aliphatic unsaturated group; and letters c and d are positive numbers satisfying $1.90 \leq c < 2.40$, $0.0003 \leq d \leq 0.10$, and $1.90 < c+d \leq 2.40$, the organopolysiloxane containing at least two aliphatic unsaturated groups in a molecule and having a viscosity of 100 to 1,000,000 centipoise at 25° C., and (D) 0 to 70% by weight of a silicone resin comprising $R_pR^2_qSiO_{1/2}$ units (M) $SiO_2$ units (Q) and/or $YSiO_{3/2}$ units (T) wherein R and $R^2$ are as defined above, letters p and q each are equal to 0, 1, 2 or 3 and satisfy p+q=3, Y is selected from R and $R^2$, molar ratio M/(Q+T)=0.6 to 1.2, and molar ratio $R^2$/Si=0.1 to 0.10, the silicone resin being soluble in component (C), the composition further comprising (F) an organohydrogenpolysiloxane of the following average compositional formula (3):

$$R_eH_fSiO_{(4-e-f)/2} \quad (3)$$

wherein R, which is identical or different, is a substituted or unsubstituted monovalent hydrocarbon group free of an aliphatic unsaturated bond or an alkoxy group, letters e and f are positive numbers satisfying $0.70 \leq e \leq 2.69$, $0.01 \leq f \leq 1.20$, and $1.5 \leq e+f \leq 2.7$, the organohydrogenpolysiloxane containing at least two SiH groups in a molecule, in such an amount that 0.4 to 10 SiH groups are available per aliphatic unsaturated group supplied from components (C) and (D), and (G) a catalytic amount of a platinum catalyst for effecting hydrosilylation between the aliphatic unsaturated groups in components (C) and (D) and the SiH group in component (F) upon light exposure, said silicone rubber composition being curable upon exposure to light having a wavelength of 200 to 500 nm into a cured product having a Shore A hardness of 20 to 60 without silica and a light transmittance of at least 10% as measured at a thickness of 10 mm.

5. A composition as in claim 4 which comprises 10–50% by weight of (D).

6. A method of preparing a templating mother mold adapted to mold a photo-curable liquid resin therein which comprises curing a photo-curable liquid silicone rubber composition of claim 3 upon exposure to light having a wavelength of 200 to 500 mm.

7. A method of preparing a templating mother mold adapted to mold a photo-curable liquid resin therein which comprises curing a photo-curable liquid silicone rubber composition of claim 4 upon exposure to light having a wavelength of 200 to 500 mm.

8. A method of preparing a templating mother mold adapted to mold a photo-curable liquid resin therein which comprises curing a photo-curable liquid silicone rubber composition of claim 5 upon exposure to light having a wavelength of 200 to 500 mm.

* * * * *

Disclaimer 5,952,397—Hironao Fujiki; Takafumi Sakamoto, both of Usui-gun, Japan. PHOTO-CURABLE LIQUID SILICONE RUBBER COMPOSITIONS FOR TEMPLATING MOTHER MOLDS. Patent dated September 14, 1999. Disclaimer filed August 27, 2001, by the assignee, Shin-Etsu Chemical Co., Ltd.

Hereby enters this disclaimer to claims 6, 7 and 8.

*(Official Gazette, December 25, 2001)*

Disclaimer 5,952,397 — Hironao Fujiki; Takafumi Sakamoto, both of Usui-gun, Japan. PHOTO-CURABLE LIQUID SILICONE RUBBER COMPOSITIONS FOR TEMPLATING MOTHER MOLDS. Patent dated September 14, 1999. Disclaimer filed August 27, 2001, by assignee, Shin-Etsu Chemical Co., Ltd.

Hereby enters this disclaimer to claims 6, 7 and 8.

*(Official Gazette, January 8, 2002)*